United States Patent
Zou et al.

(10) Patent No.: US 12,120,688 B2
(45) Date of Patent: Oct. 15, 2024

(54) METHODS FOR SCHEDULING REQUEST CANCELATION WHEN COLLIDING WITH UPLINK-SHARED CHANNEL AND RELATED APPARATUSES

(71) Applicant: Telefonaktiebolaget LM Ericsson (publ), Stockholm (SE)

(72) Inventors: Zhenhua Zou, Solna (SE); Torsten Dudda, Aachen (DE); Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 459 days.

(21) Appl. No.: 17/441,837

(22) PCT Filed: Mar. 27, 2020

(86) PCT No.: PCT/EP2020/058785
§ 371 (c)(1),
(2) Date: Sep. 22, 2021

(87) PCT Pub. No.: WO2020/193768
PCT Pub. Date: Oct. 1, 2020

(65) Prior Publication Data
US 2022/0191909 A1    Jun. 16, 2022

Related U.S. Application Data (60) Provisional application No. 62/825,699, filed on Mar. 28, 2019.

(51) Int. Cl.
*H04W 72/21*    (2023.01)
*H04W 72/23*    (2023.01)

(52) U.S. Cl.
CPC .......... *H04W 72/21* (2023.01); *H04W 72/23* (2023.01)

(58) Field of Classification Search
CPC . H04W 72/02; H04W 72/04; H04W 72/0446; H04W 72/121; H04W 72/23; H04W 72/50; H04W 72/51; H04W 72/52; H04W 72/53; H04W 72/54;
(Continued)

(56) References Cited

U.S. PATENT DOCUMENTS

2020/0196327 A1* 6/2020 Zhang ................... H04W 72/21
2020/0236582 A1* 7/2020 Chin ..................... H04W 72/23

OTHER PUBLICATIONS

International Search Report and Written Opinion dated Jun. 22, 2020 for International Application No. PCT/EP2020/058785 filed Mar. 27, 2020, consisting of 11-pages.
(Continued)

*Primary Examiner* — Bo Hui A Zhu
(74) *Attorney, Agent, or Firm* — Weisberg I.P. Law, P.A.

(57) ABSTRACT

A method performed by a terminal in a wireless network for determining whether to cancel a scheduling request is provided. The method includes determining that a scheduling request is triggered for requesting an uplink resource for transmission of data to a network node. The method further includes, responsive to an uplink grant from the network node, transmitting the scheduling request to the network node without a cancellation of the scheduling request occurring due to a buffer status report indicator included in a protocol data unit of the terminal.

17 Claims, 8 Drawing Sheets

---

The MAC entity shall:
1> if the Buffer Status reporting procedure determines that at least one BSR has been triggered and not cancelled:
    2> if UL-SCH resources are available for a ne transmission:
        3> instruct the Multiplexing and Assembly procedure to generate the BSR MAC CE(s);
        3> start or restart *periodicBSR-Timer* except when all the generated BSRs are long or short Truncated BSRs;
        3> start or restart *retxBSR-Timer*.
    2> <u>If a regular BSR has been triggered and logicalChannelSR-Delay Timer is not running</u>:
        3> if the is no UL_SCH resource available for new transmission; or
        3> if the MAC entity is configured with configured uplink grant(s) and the Regular BSR was not triggered for a logical channel for which logical channel SR masking *(logicalChannelSR-Mask)* is setup by upper layers; or
        3>if the UL-SCH resources available for a new transmission do not meet the LCP mapping restrictions (see subclause 5.4.3.1) configured for the logical channel(s) that triggered the BSR(s):
            4> trigger a Scheduling Request.

(58) Field of Classification Search
CPC .......... H04W 72/541; H04W 72/542; H04W 72/543; H04W 72/56
See application file for complete search history.

(56) References Cited

OTHER PUBLICATIONS

3GPP TS 38.321 V15.3.0; 3rd Generation Partnership Project; Technical Specification Group Radio Access Network; NR; Medium Access Control (MAC) protocol specification (Release 15), Sep. 2018, consisting of 76-pages.

3GPP TR 38.825 V0.0.0; 3rd Generation Partnership Project; Technical Specification Group Radio Access Network; Study on NR Industrial Internet of Things (IoT) (Release 16), Sep. 2018, consisting of 10-pages.

3GPP TSG RAN meeting #81 RP-182090; Title: Revised SID: Study on NR Industrial Internet of Things (IoT); Agenda Item: 9.3.12; Source: Nokia, Nokia Shanghai Bell; Document for: Approval; Date and Location: Sep. 10-13, 2018, Gold Coast, Australia, consisting of 5-pages.

3GPP TSG-RAN WG2 #105 Tdoc R2-1901302 revision of R2-1817177; Title: On scheduling request overlapping with UL-SCH Agenda Item: 11.7.3; Source: Ericsson; Document for: Discussion; Date and Location: Feb. 25-Mar. 1, 2019, Athens, Greece, consisting of 4-pages.

3GPP TSG-RAN WG2 Meeting #105 R2-1900843 (resubmission of R2-1816944); Title: SR cancellation for URLLC service; Agenda Item: 11.7.3; Source: Vivo; Document for: Discussion and Decision; Date and Location: Feb. 25-Mar. 1, 2019, Athens, Greece, consisting of 4-pages.

3GPP TSG-RAN WG2 Meeting #105 R2-1902171; Title: Prioritization between URLLC SR and eMBB PUSCH; Agenda Item: 11.7.3 (FS_NR_IIOT); Source: LG Electronics Inc.; Document for: Discussion and Decision; Date and Location: Feb. 25-Mar. 1, 2019, Athens, Greece, consisting of 2-pages.

3GPP TSG-RAN WG2 Meeting #99bis R2-1710974; Title: Discussion on the SR cancellation and failure handling; Agenda Item: 10.3.1.5; Source: Vivo; Document for: Discussion and Decision; Date and Location: Oct. 9-13, 2017, Prague, Czech Republic, consisting of 4-pages.

* cited by examiner

The MAC entity shall:
1> if the Buffer Status reporting procedure determines that at least one BSR has been triggered and not cancelled:
    2> if UL-SCH resources are available for a ne transmission:
        3> instruct the Multiplexing and Assembly procedure to generate the BSR MAC CE(s);
        3> start or restart *periodicBSR-Timer* except when all the generated BSRs are long or short Truncated BSRs;
        3> start or restart *retxBSR-Timer*.
    2> <u>If a regular BSR has been triggered and logicalChannelSR-Delay Timer is not running</u>:
        3> if the is no UL_SCH resource available for new transmission; or
        3> if the MAC entity is configured with configured uplink grant(s) and the Regular BSR was not triggered for a logical channel for which logical channel SR masking *(logicalChannelSR-Mask)* is setup by upper layers; or
        3>if the UL-SCH resources available for a new transmission do not meet the LCP mapping restrictions (see subclause 5.4.3.1) configured for the logical channel(s) that triggered the BSR(s):
            4> trigger a Scheduling Request.

Figure 1

As long as at least one SR is pending, the MAC entity shall for each pending SR:
1> if the MAC entity has no valid PUCCH resource configured for the pending SR:
    2> initiate a Random Access procedure (see subclause 5.1) on the SpCell and cancel the pending SR.
1> else, for the SR configuration corresponding to the pending SR:
    2> when the MAC entity has an SR transmission occasion on the valid PUCCH resource for SR configured, and
    2> if *sr-ProhibitTimer* is not running at the time of the SR transmission occasion; and
    2> if the PUCCH resource for the SR transmission occasion does not overlap with a measurement gap, and
    2> if the PUCCH resource for the SR transmission occasion does not overlap with a UL-SCH resource:
        3> if *SR_COUNTER<sr-TransferMAX*;
            4> increment *SR_COUNTER* by 1.

When an SR is triggered, it shall be considered as pending until it is cancelled. All pending SR(s) triggered prior to the MAC PDU assembly shall be cancelled and each respective *sr-ProhibitTimer* shall be stopped when the MAC PDU is transmitting and this PDU includes a BSR MAC CE which contains buffer status up to (and including) the last event that triggered a BSR (see subclause 5.4.5) prior to the MAC PDU assembly. All pending SR(s) shall be cancelled and each respective *sr-ProhibitTimer* shall be stopped when the UL grant(s) can accommodate all pending data available for transmission.

Figure 4

1. Data arrival
2. MAC PDU for UL SCH not built
3. BSR MAC CE included in UL SCH

Cancel scheduling request when scheduling request configuration is mapped to existing PUCCH configuration having a long period — 1000

Figure 10

Cancel scheduling request for a logical channel associated with non-critical service — 1100

Figure 13

METHODS FOR SCHEDULING REQUEST CANCELATION WHEN COLLIDING WITH UPLINK-SHARED CHANNEL AND RELATED APPARATUSES

CROSS-REFERENCE TO RELATED APPLICATIONS

This application is a Submission Under 35 U.S.C. § 371 for U.S. National Stage Patent Application of International Application No.: PCT/EP2020/058785, filed Mar. 27, 2020 entitled "METHODS FOR SCHEDULING REQUEST CANCELATION WHEN COLLIDING WITH UPLINK-SHARED CHANNEL AND RELATED APPARATUSES," which claims priority to U.S. Provisional Application No. 62/825,699, filed Mar. 28, 2019, the entireties of both of which are incorporated herein by reference.

TECHNICAL FIELD

The present disclosure relates generally to wireless communications systems and, more particularly, to a terminal in a wireless network determining whether to cancel a scheduling request.

BACKGROUND

In a new generation wireless communication system (5G or NR), there may be a scenario that calls for a faster indication from user equipment (UE, also referred to herein as a terminal) to a gNB about an arrival of ultra reliable low-latency communication (URLLC) traffic while there is an ongoing uplink-shared channel (UL-SCH) transmission with a long duration for enhanced mobile broadband (eMBB) traffic, e.g., the UL-SCH resources do not meet the logical channel prioritization (LCP) mapping restrictions for URLLC traffic.

SUMMARY

According to various embodiments of inventive concepts, a method performed by a terminal in a wireless network for determining whether to cancel a scheduling request is provided. The method includes determining that a scheduling request is triggered for requesting an uplink resource for transmission of data to a network node. The method further includes, responsive to an uplink grant from the network node, transmitting the scheduling request to the network node without a cancellation of the scheduling request occurring due to a buffer status report indicator included in a protocol data unit of the terminal.

In some embodiments, further operations performed by a terminal in a wireless network include transmitting to the network node at least one scheduling request triggered prior to the protocol data unit that includes the buffer status report indicator. The further operations include transmitting to the network node the protocol data unit that includes the buffer status report indicator. The further operations include cancelling the at least one scheduling request when the uplink grant can accommodate all pending data available for transmission.

In some embodiments, further operations performed by a terminal in a wireless network include cancelling the scheduling request when the scheduling request configuration is mapped to an existing physical uplink control channel configuration having a long period.

In some embodiments, wherein the logical channel is associated with a non-critical service, and further operations performed by a terminal in a wireless network include canceling the scheduling request for a logical channel associated with the non-critical service.

Corresponding embodiments of inventive concepts for a terminal in a wireless network, computer products, and computer programs are also provided When a buffer status report BSR media access control element is included in the uplink-shared channel (UL-SCH) (e.g., new high priority data is available soon enough prior to starting the UL-SCH transmission), a scheduling request (SR) is cancelled.

Various embodiments of the present disclosure may provide solutions to these and other potential problems. In various embodiments of the present disclosure, a SR for high priority data can be sent when the BSR MAC CE is included in a MAC PDU, and the SR is not cancelled. As a consequence, conditions are provided under which a UE may not cancel the SR, while preserving legacy behavior that the transmission of the BSR MAC CE can cancel the SR if the traffic is low priority

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 1 shows a portion of clause 5.4.5 of 3GPP TS 38.321, Rel. 15;

FIG. 2 shows a portion of clause 5.4.4 of 3GPP TS 38.321, Rel. 15;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive.

Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "terminal" is used in a non-limiting manner and, as explained below, can refer to any type of radio communication terminal. The term "terminal" herein may be interchangeable replaced with the term "radio terminal," "radio communication terminal," "radio device," "user equipment (UE)," or "IoT device".

Further, note that terminology used here such as gNB is non-limiting and does not imply or otherwise constrain a certain hierarchical relation between a gNB and a terminal. The term "gNB" can be any wireless communication device "device 1" and the term "terminal" can also be any wireless communication device "device 2", and these two devices communicate with each other over a radio channel. Alternatively, other terminology such as "gNodeB" can be used in place of "gNB" for embodiments to be utilized in different communication systems. Although various embodiments are described in the example context of wireless transmissions in the uplink, these and other embodiments can be used for wireless transmissions in the downlink.

In the following the reference 3GPP TS 38.321 Rel. 15 corresponds to Version 15.4.0 of said standard.

In a scenario that calls for a faster indication from a UE to a gNB about an arrival of URLLC traffic while there is an ongoing UL-SCH transmission with a long duration for eMBB traffic, a regular buffer status report (BSR) may be triggered for URLLC traffic. In addition to that, a scheduling request (SR) also may be triggered since the UL-SCH resources do not meet the LCP mapping restrictions, according to clause 5.4.5 of 3GPP TS 38.321, Rel. 15. FIG. 1 shows a portion of clause 5.4.5 of 3GPP TS 38.321, Rel. 15. Note that the underlined text in FIG. 1 does not start with "else if", thus the two conditions numbered by 2> are checked independently. Even though a buffer status report media access control element (BSR MAC CE) can be generated, a scheduling request is still triggered due to LCP mapping restriction.

However, the triggered scheduling request may not be sent if the allocated physical uplink control channel (PUCCH) resource overlaps an ongoing UL-SCH transmission. As stated in clause 5.4.4 of 3GPP TS 38.321, Rel. 15, one of the conditions to instruct the physical layer to signal the SR on one valid PUCCH resource for a SR is that the PUCCH resource for the SR transmission occasion does not overlap with a UL-SCH resource. FIG. 2 shows a portion of clause 5.4.4 of 3GPP TS 38.321, Rel. 15.

In NR, there is a mapping between the logical channel and the SR configuration. Since this is a high priority logical channel, it is expected that the network allocate frequent PUCCH resources for the transmission of SR. The 3GPP TS 38.321, Rel. 15 states that the SR can only be transmitted on the first PUCCH resource after UL-SCH. This may introduce unnecessary latency and may lead to a latency target of this logical channel not being met.

Figure 3:
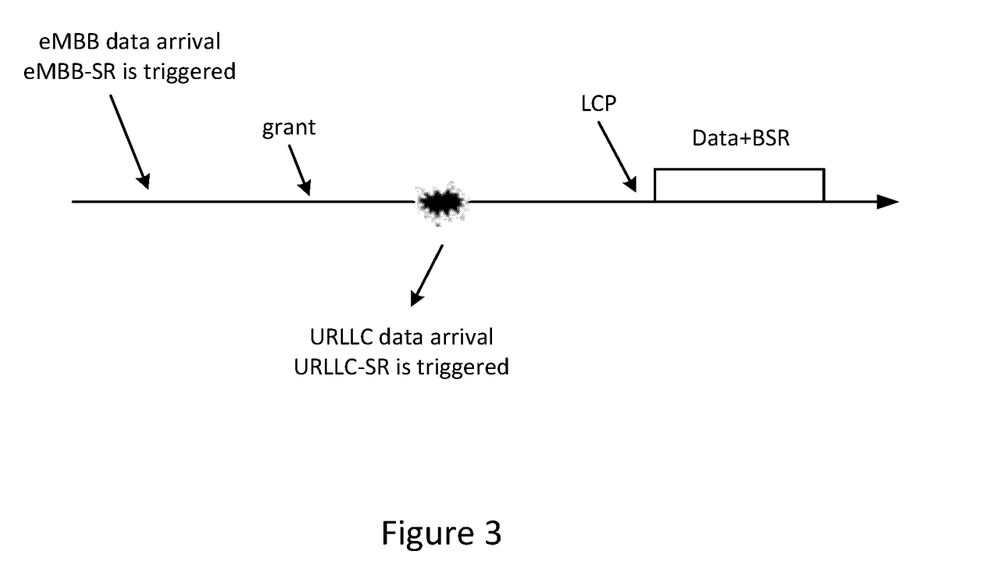
FIG. 3 illustrates an example where a URLLC-SR collides with a PUSCH transmission for eMBB.

FIG. 3 illustrates an example where an URLLC-SR collides with a physical uplink shared channel transmission for eMBB. In this example, based on an existing MAC procedure, an SR for URLLC can be triggered upon arrival of the new URLLC data during the interval between the time when the UE has received a grant for eMBB data and the time when the actual PUSCH transmission is started for eMBB (referred to as a K2 period or interval). In this case, the trigger of SR for URLLC is allowed since the existing UL-SCH resources do not meet the LCP restriction for URLLC service. For this newly triggered SR, there may be two possible cases concerning how to initiate an SR transmission on PUCCH.

In one case, there may be a PUCCH-SR occasion/resource available for URLLC service during the interval K2. In this case, the UE may initiate the corresponding SR transmission on PUCCH before the PUSCH transmission for eMBB is started. This is possible, since the UE may be configured with a URLLC specific SR configuration which includes separate PUCCH-SR resource/configuration which fits with URLLC quality of service (QoS) requirement.

In a second case, there may be no PUCCH-SR occasion/resource available for URLLC service during the interval K2. In this case, the UE may have to wait until the PUSCH transmission for eMBB is finished although there may be available PUCCH-SR occasion/resource during the PUSCH transmission. This is because the parallel transmission between PUSCH and PUCCH is not allowed in the current release of 3GPP TS 38.321, Rel. 15.

In the second case, an additional latency may be incurred for URLLC service, which may not be acceptable since URLLC is latency critical. Therefore, demand exists for an improved SR mechanism for URLLC, including e.g., in the second case.

This issue has been discussed in a 3GPP study item (RP-182090, Revised SID: Study on NR Industrial Internet of Things (IoT)). The study concluded among other things that it may be deemed beneficial to support enhanced prioritization between different intra-UE traffic types and priorities. In follow-up work item RP-190728, the detailed objectives for NR intra-UE prioritization/multiplexing include:

Address UL data/control and control/control resource collision by:
specifying a method to address resource collision between SR associating to high-priority traffic and uplink data of lower-priority traffic for the cases where MAC determines the prioritization [RAN2].

In both LTE and NR, the triggering of the SR is intertwined with the buffer status report (BSR). A UE sends a regular BSR, if data becomes ready for transmission when the transmit buffers were previously empty, or if data becomes ready for transmission on a logical channel with a higher priority than the buffers were previously storing, or if a timer expires while data are waiting for transmission. Only if the UE wishes to send a regular BSR but does not have the PUSCH resources on which to do so, then it sends the gNB a scheduling request on the PUCCH. Consequently, the UE does not transmit SR immediately if it would like to ask for new UL resources for buffered data. Basically, a scheduling request is triggered by an inability to send a regular BSR.

As stated in 3GPP TR 38.825 V1.0.0, for resource collision between SR associating to high-priority traffic and uplink data of lower-priority traffic, the current specifications of Rel-15 refrains transmission of SR by always prioritizing UL-SCH, which may cause a delay for the SR transmission and may ultimately result in failure to meet the QoS requirement of high-priority traffic. In the 3GPP TR 38.825, a high-level method is mentioned: address a resource collision between SR associating to high-priority traffic and uplink data of lower-priority traffic, e.g. by specifying a prioritization handling rule to determine whether to transmit SR or PUSCH based on, e.g. the priority of the LCH which triggers the SR and priorities of the data to be transmitted on the PUSCH resource.

However, as discussed above, the triggering of SR is related to regular BSR. The current handling of the BSR MAC CE in Rel-15 of 3GPP 38.321 does not resolve the issue of high-priority SR being refrained from transmission due to over-lapping UL-SCH.

Figure 4:
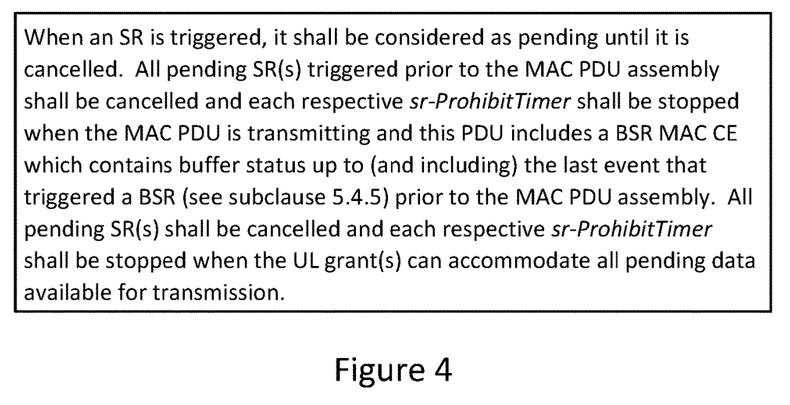
FIG. 4 shows a portion of clause 5.4.4 from 3GPP TS 38.321, Rel. 15.
Figure 5:
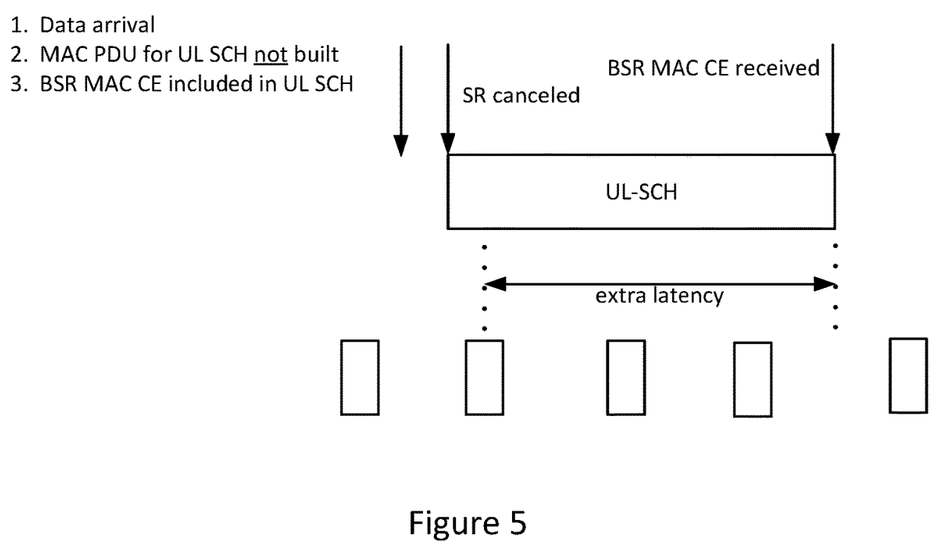
FIG. 5 shows an example of a BSR MAC CE included in a UL-SCH and the SR cancelled.

This is related to when the BSR MAC CE is included in the UL-SCH (e.g., new high priority data is available soon enough prior to starting the UL-SCH transmission), the SR is cancelled according to clause 5.4.4 in 3GPP TS 38.321, Rel. 15. FIG. 4 shows a portion of clause 5.4.4 of 3GPP TS 38.321, Rel. 15. FIG. 5 shows an example of a BSR MAC CE included in a UL-SCH and the SR cancelled.

Notwithstanding the SR handling discussed above, there continues to exist demand for an improved SR mechanism for high priority traffic.

The problem referenced above when the BSR MAC CE is included in the MAC PDU and hence SR is cancelled, may be solved with conditions under which a UE should not cancel the SR, while preserving the legacy behavior that the transmission of the BSR MAC CE can cancel the SR if the traffic is low priority.

Figure 6:
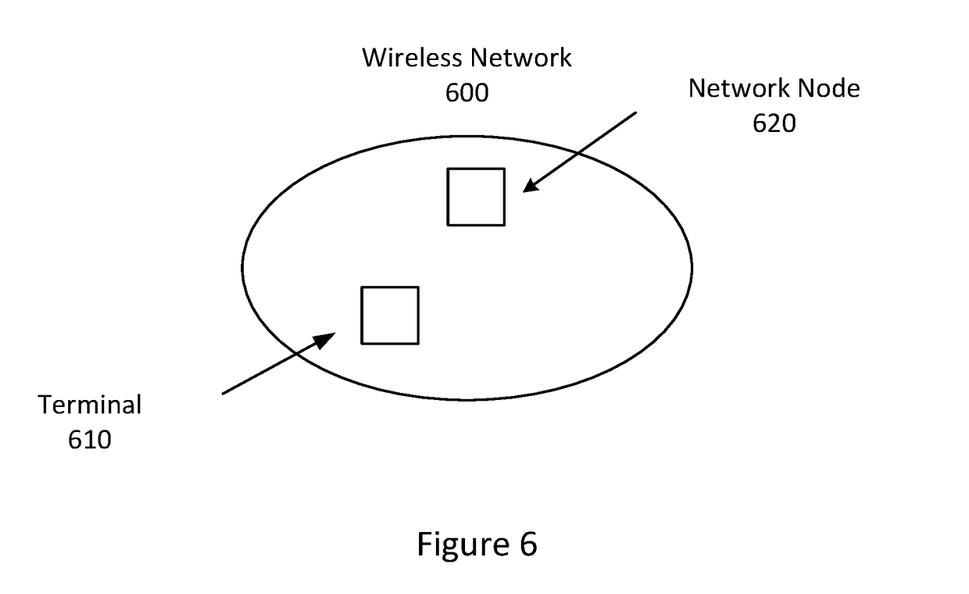
FIG. 6 illustrates a wireless network in accordance with some embodiments of the present disclosure.

FIG. 6 illustrates a wireless network in accordance with some embodiments of inventive concepts.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 600, terminal 610, and network node 620. In practice, a wireless network may further include any additional elements suitable to support communication between wireless devices or between a wireless device and another communication device, such as an IoT device or any other network node. Of the illustrated components, terminal 610 and network node 620 are shown with additional detail in FIGS. 12 and 13. The wireless network may provide communication and other types of services to one or more terminals to facilitate the terminal's access to and/or use of the services provided by, or via, the wireless network. Wireless network 600 may comprise an IoT network.

In various embodiments of the present disclosure, a SR for high priority data can be sent when the BSR MAC CE is included in a MAC PDU, and the SR is not cancelled. For example, new data in a URLLC communication may arrive while there is an ongoing UL-SCH transmission. A SR can be triggered. A UL grant from a network node can occur, which may be a dynamic uplink grant or a configured uplink grant (e.g., pre-configured for a period of time). Responsive to the uplink grant from the network node, the terminal can transmit the SR to the network node without a cancellation of the SR occurring due to a BSR indicator included in a PDU of the terminal.

In some embodiments, a SR is not cancelled, if BSR MAC CE is included in a PDU and this PDU is to be transmitted on a grant that does not meet the LCP mapping restriction for LCH(s) that have data available according to the BSR MAC CE. The following underlined text shows how this embodiment can be implemented in the specification, 3GPP 38.321 clause 5.4.4, Rel. 15:

When an SR is triggered, it shall be considered as pending until it is cancelled. All pending SR(s) triggered prior to the MAC PDU assembly shall be cancelled and each respective sr-ProhibitTimer shall be stopped when the MAC PDU is transmitted and this PDU includes a BSR MAC CE which contains buffer status up to (and including) the last event that triggered a BSR (see subclause 5.4.5) prior to the MAC PDU assembly and this PDU is to be transmitted on a grant that meets the LCP mapping restriction for LCH(s) that have data available according to the BSR MAC CE. All pending SR(s) shall be cancelled and each respective sr-ProhibitTimer shall be stopped when the UL grant(s) can accommodate all pending data available for transmission.

In other embodiments, it is configurable if triggered SRs belonging to a SR configuration can be cancelled due to (conditional) transmission of the BSR MAC CE on an existing PUSCH. This configuration is through RRC signalling. This way, SR cancelling can be done on SR configurations mapped to PUCCH configurations with e.g. long periods, in which cases the BSR would already have provided information on uplink data availability to the network and there is no need to wait anymore for the SR. On the other hand, this way, SR cancelling can be avoided for SR configurations mapped to PUCCH configurations with e.g. short periods. In those cases, as discussed above, faster indication to network about uplink data availability may be achieved.

In other embodiments, the configuration may be per a LCH/SR configuration. An LCH can be configured so that the SR it triggers due to the arrival of data of this LCH is not canceled even if the BSR MAC CE is included in a PDU. This cancelling can be selectively per LCH since cancelling the SR on the one hand reduces UL interference when transmitting it redundantly, which may be done for logical channels associated with non-critical services. On the other hand, for logical channels associated with critical services, it may be more important to provide indication of uplink data availability to the network as soon as possible, therefore SR cancelling may be avoided.

Presently disclosed embodiments may operate to allow for a UE 610 not to cancel a SR when a BSR MAC CE is included in a MAC PDU, while preserving the legacy behavior that the transmission of the BSR MAC CE may cancel the SR if the traffic is low priority.

Figure 7:
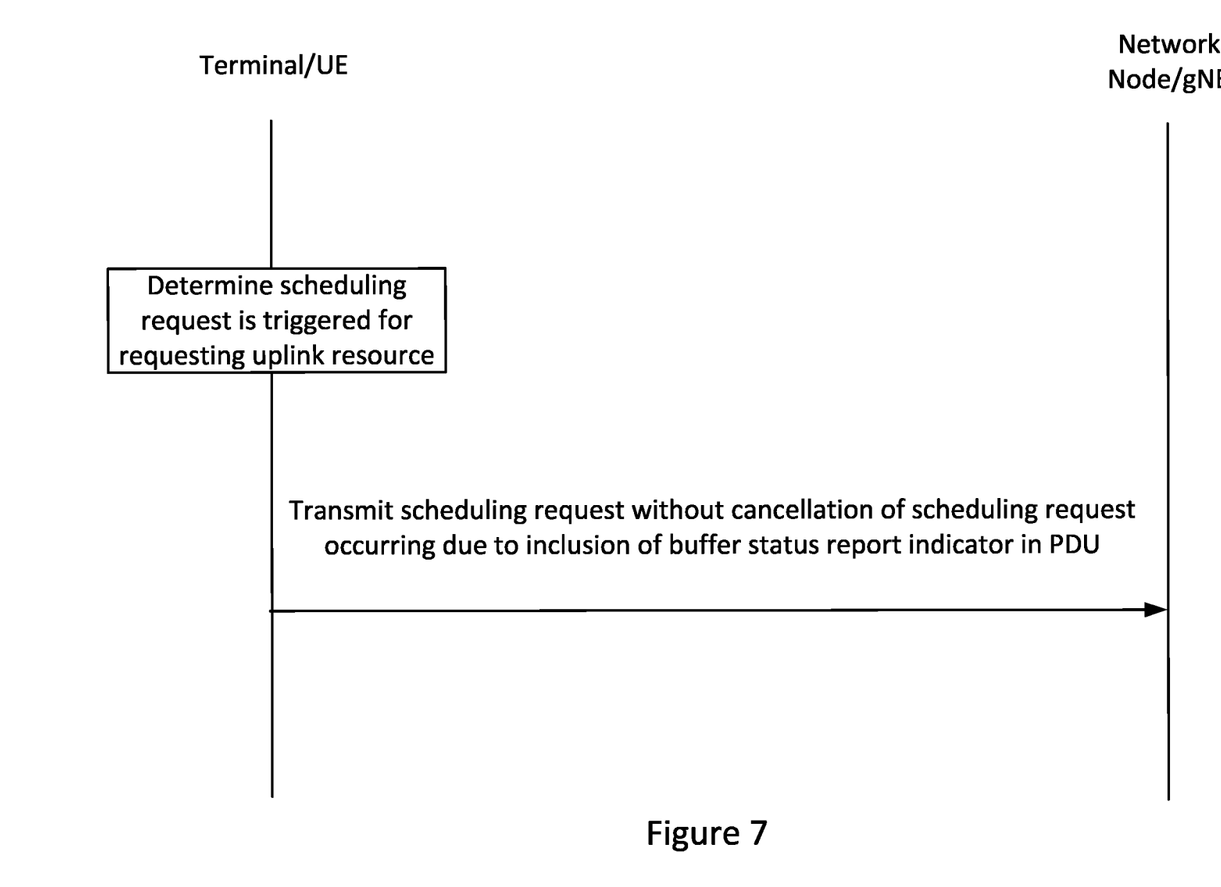
FIG. 7 illustrates operations of a terminal for determining whether to cancel a scheduling request, in accordance with some embodiments of the present disclosure.

FIG. 7 illustrates operations of a terminal 610 for determining whether to cancel a scheduling request. With reference to FIG. 7, the terminal can determine that a scheduling request is triggered for requesting an uplink resource for transmission of data to a network node. Responsive to an uplink grant from the network node, the terminal can transmit the scheduling request to the network node without cancellation of the scheduling request occurring due to a buffer status report indicator included in a protocol data unit of the terminal.

These and other related operations that can be performed by a terminal will now be described in the context of the operational flowcharts of FIGS. 8-11.

Figure 8:
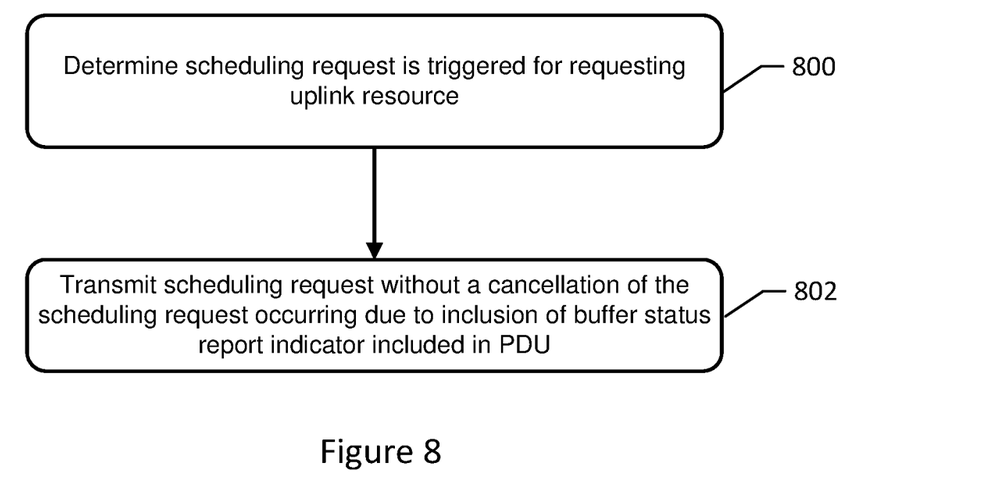
FIGS. 8-11 are flowcharts of operations that may be performed by a terminal, in accordance with some embodiments of the present disclosure.

Referring initially to FIG. 8, operations can be performed by a terminal (e.g., terminal 610 shown in more detail in FIG. 12) for determining whether to cancel a scheduling request. The operations include determining 800 that a scheduling request is triggered for requesting an uplink resource for transmission of data to a network node. The operations further include, responsive to an uplink grant from the network node, transmitting 802 the scheduling request to the network node without a cancellation of the scheduling request occurring due to a buffer status report indicator included in a protocol data unit of the terminal.

In at least some embodiments, the operation of transmitting includes transmitting the protocol data unit that includes the buffer status report indicator on a logical channel that meets a logical channel prioritization mapping restriction for at least one logical channel having data available according to the buffer status report indication.

Figure 9:
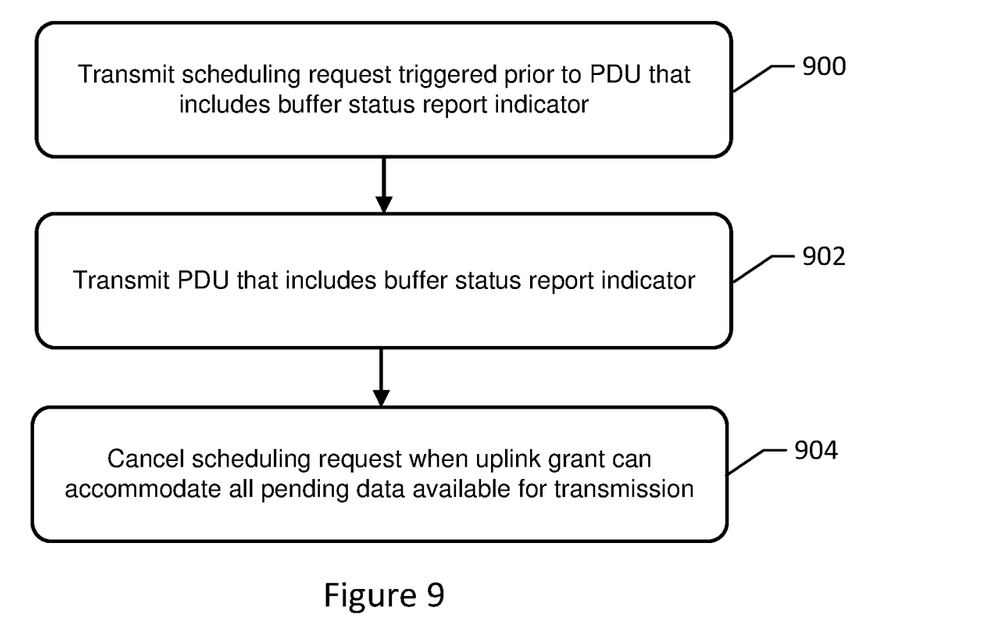

With reference to FIG. 9, further operations that can be performed by the terminal 610 can include transmitting 900 to the network node at least one scheduling request triggered prior to the protocol data unit that includes the buffer status report indicator. The operations can further include transmitting 902 to the network node the protocol data unit that includes the buffer status report indicator. The operations can further include cancelling 904 the at least one scheduling request when the uplink grant can accommodate all pending data available for transmission.

In some embodiments, the triggered scheduling request includes a scheduling request configuration subject to cancellation due to transmission of the buffer status report indicator on an existing physical uplink shared channel. The scheduling request configuration can be via radio resource control signaling. The transmitting operation that is performed by the terminal includes transmitting the scheduling request when the scheduling request configuration is mapped to an existing physical uplink control channel configuration having a short period.

Figure 10:
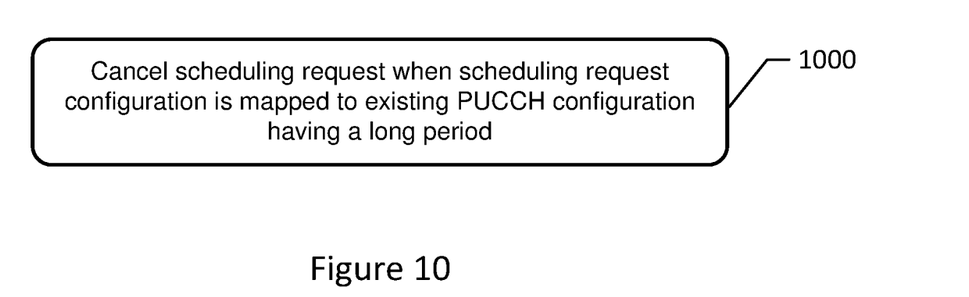

With reference to FIG. 10, further operations that can be performed by the terminal 610 can include cancelling 1000 the scheduling request when the scheduling request configuration is mapped to an existing physical uplink control channel configuration having a long period.

Referring again to FIG. 8, in some embodiments the operation of transmitting includes transmitting the scheduling request to the network node without a cancellation of the scheduling request occurring due to the buffer status report indicator included in the protocol data unit comprises configuring a logical channel not to cancel the protocol data unit before the scheduling request is triggered.

In one embodiment, the logical channel is associated with a critical service.

Figure 11:
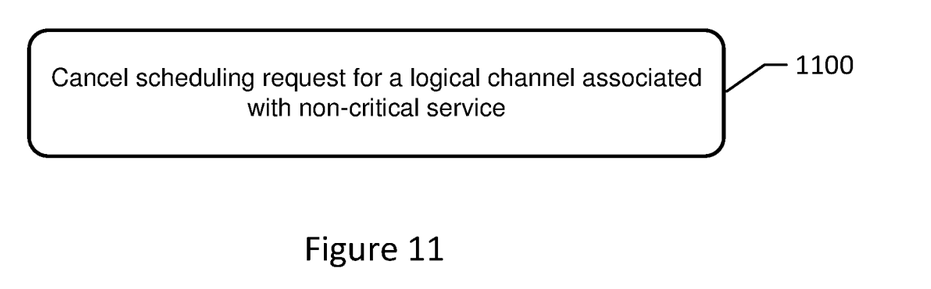

In one embodiment, the logical channel is associated with a non-critical service. With reference to FIG. 11, further operations that can be performed by the terminal can include canceling 1100 the scheduling request for a logical channel associated with the non-critical service.

In the various embodiments, the wireless network can be an IoT network.

Figure 12:
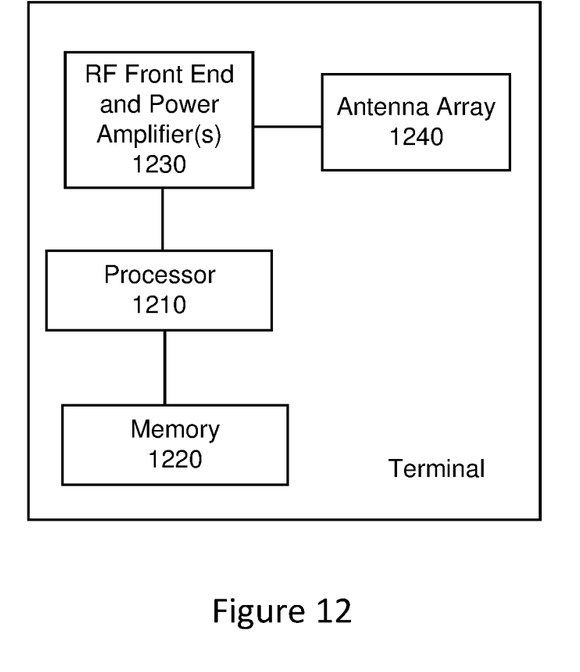
FIG. 12 is a block diagram of elements of a terminal that are configured according to some embodiments of the present disclosure.

FIG. 12 is a block diagram illustrating a terminal 610 that is configured according to some embodiments. The terminal 610 can include, without limitation, a wireless terminal, a wireless communication device, a wireless communication terminal, a terminal node/UE/device, an IoT device etc. The terminal 610 includes a RF front-end 1230 comprising one or more power amplifiers the transmit and receive through antennas of an antenna array 1240 to provide uplink and downlink radio communications with a radio network node (e.g., a base station, gNB, etc.) of a wireless network. Terminal 610 further includes a processor circuit 1210 (also referred to as a processor) coupled to the RF front end 1230 and a memory circuit 1220 (also referred to as memory). The memory 1220 stores computer readable program code that when executed by the processor 1210 causes the processor 1210 to perform operations according to embodiments disclosed herein.

Figure 13:
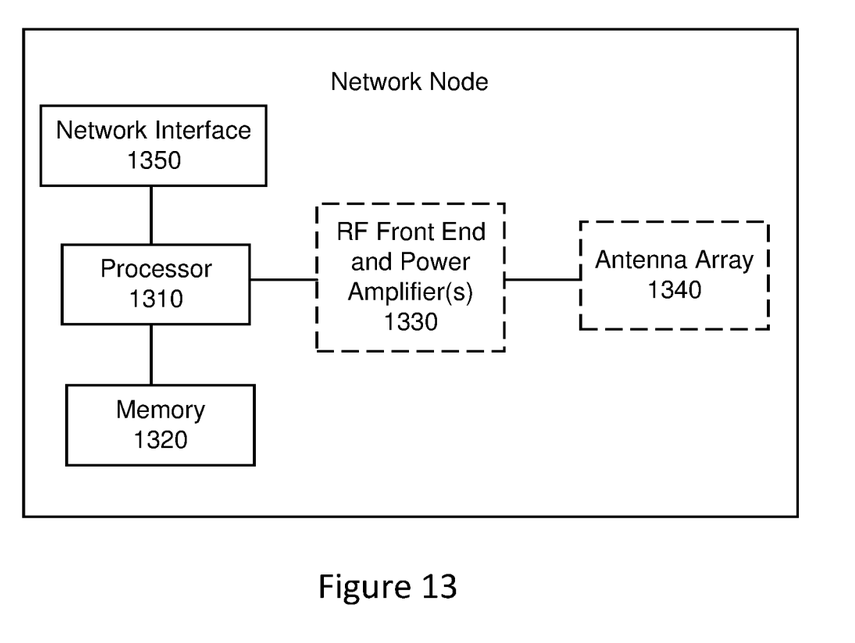
FIG. 13 is a block diagram of elements of a network node that are configured according to some embodiments of the present disclosure.

FIG. 13 is a block diagram illustrating in more detail a network node 620 (e.g., a base station, gNB, etc.) of a wireless network. The network node 620 includes a processor circuit 1310 (also referred to as a processor), a memory circuit 1320 (also referred to as memory), and a network interface 1350 (e.g., wired network interface and/or wireless network interface) configured to communicate with other network nodes. The network node 620 may be configured as a radio network node containing a RF front end with one or more power amplifiers 1330 that transmit and receive through antennas of an antenna array 1340. The memory 1320 stores computer readable program code that when executed by the processor 1310 causes the processor 1310 to perform operations according to embodiments disclosed herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Listing of Embodiments:

Embodiment 1. A method by a terminal (e.g., 610) in a wireless network (e.g., 600) for determining whether to cancel a scheduling request is provided. The method includes determining (e.g., 800) that a scheduling request is triggered for requesting an uplink resource for transmission of data to a network node (e.g., 620). The method further includes, responsive to an uplink grant from the network node, transmitting (e.g., 802) the scheduling request to the network node without a cancellation of the scheduling request occurring due to a buffer status report indicator included in a protocol data unit of the terminal.

Embodiment 2. The method of Embodiment 1, wherein the transmitting comprises transmitting the protocol data unit that includes the buffer status report indicator on a logical channel that meets a logical channel prioritization mapping restriction for at least one logical channel having data available according to the buffer status report indication.

Embodiment 3. The method of any of Embodiments 1 to 2, further including: transmitting (e.g., 900) to the network node at least one scheduling request triggered prior to the protocol data unit that includes the buffer status report indicator. The method further includes transmitting (e.g., 902) to the network node the protocol data unit that includes the buffer status report indicator. The method further includes cancelling (e.g., 904) the at least one scheduling request when the uplink grant can accommodate all pending data available for transmission.

Embodiment 4. The method of Embodiment 1, wherein the triggered scheduling request includes a scheduling request configuration subject to cancellation due to transmission of the buffer status report indicator on an existing physical uplink shared channel. The scheduling request configuration is via radio resource control signaling.

Embodiment 5. The method of Embodiment 4, wherein the transmitting includes transmitting the scheduling request when the scheduling request configuration is mapped to an existing physical uplink control channel configuration having a short period.

Embodiment 6. The method of Embodiment 5, further including: cancelling (e.g., 1000) the scheduling request when the scheduling request configuration is mapped to an existing physical uplink control channel configuration having a long period.

Embodiment 7. The method of any of Embodiments 1 to 6, wherein the transmitting the scheduling request to the network node without a cancellation of the scheduling request occurring due to the buffer status report indicator included in the protocol data unit comprises configuring a logical channel not to cancel the protocol data unit before the scheduling request is triggered.

Embodiment 8. The method of Embodiment 7, wherein the logical channel is associated with a critical service.

Embodiment 9. The method of any of Embodiments 7 to 8, wherein the logical channel is associated with a non-critical service. The method further includes canceling (e.g., 1100) the scheduling request for a logical channel associated with the non-critical service.

Embodiment 10. The method of any of Embodiments 1 to 9, wherein the wireless network is an internet of things network.

Embodiment 11. A terminal (e.g., 610) adapted to perform according to any of the Embodiments 1 to 10.

Embodiment 12. A terminal (e.g., 610) in a wireless network (e.g., 600) for determining whether to cancel a scheduling request. The mobile terminal is configured to: determine that a scheduling request is triggered for requesting an uplink resource for transmission of data to a network node (e.g., 620). The mobile terminal is further configured to, responsive to an uplink grant from the network node, transmit the scheduling request to the network node without a cancellation of the scheduling request occurring due to a buffer status report indicator included in a protocol data unit of the terminal.

Embodiment 13. A terminal (e.g., 610) in a wireless network (e.g., 600) for determining whether to cancel a scheduling request. The mobile terminal includes a processor (e.g., 1210). The mobile terminal further includes a memory (e.g., 1220) coupled to the processor. The memory stores instructions that when executed by the processor causes the processor to perform operations according to any of Embodiments 1 to 10.

Embodiment 14. A computer program product, including a non-transitory computer readable storage medium including computer readable program code embodied in the medium that when executed by a processor (e.g., 1210) of a terminal (e.g., 610) causes the processor to perform operations according to any of Embodiments 1 to 10.

Claims are provided below. Reference numbers/letters are provided in parenthesis by way of example/illustration without limiting claims to particular elements indicated by reference numbers/letters.

The invention claimed is:

1. A method by a terminal in a wireless network for determining whether to cancel a scheduling request, the method comprising:
   determining that a scheduling request is triggered for requesting an uplink resource for transmission of data to a network node;
   transmitting to the network node a protocol data unit that includes a buffer status report indicator, the transmitting including transmitting the protocol data unit that includes the buffer status report indicator on a logical channel that meets a logical channel prioritization mapping restriction for at least one logical channel having data available according to the buffer status report indication; and
   responsive to an uplink grant from the network node, transmitting the scheduling request to the network node without a cancellation of the scheduling request occurring due to the buffer status report indicator included in the protocol data unit of the terminal, the transmitting the scheduling request comprising configuring a logical channel not to cancel the protocol data unit before the scheduling request is triggered.

2. The method of claim 1, further comprising:
   transmitting to the network node at least one scheduling request triggered prior to the protocol data unit that includes the buffer status report indicator;
   and
   cancelling the at least one scheduling request when the uplink grant can accommodate all pending data available for transmission.

3. The method of claim 1, wherein the triggered scheduling request comprises a scheduling request configuration subject to cancellation due to transmission of the buffer status report indicator on an existing physical uplink shared channel, wherein the scheduling request configuration is transmitted via radio resource control signaling.

4. The method of claim 3, wherein the transmitting comprises transmitting the scheduling request when the scheduling request configuration is mapped to an existing physical uplink control channel configuration having a short period.

5. The method of claim 4, further comprising:
   cancelling the scheduling request when the scheduling request configuration is mapped to an existing physical uplink control channel configuration having a long period.

6. The method of claim 1, wherein the logical channel is associated with a critical service.

7. The method of claim 6, wherein the logical channel is associated with a non-critical service, and further comprising:
   canceling the scheduling request for a logical channel associated with the non-critical service.

8. The method of claim 1, wherein the wireless network is an internet of things network.

9. A terminal in a wireless network for determining whether to cancel a scheduling request, the terminal comprising:
   a processor; and
   a memory coupled to the processor, wherein the memory stores instructions that when executed by the processor causes the processor to:
   determine that a scheduling request is triggered for requesting an uplink resource for transmission of data to a network node;
   transmit to the network node a protocol data unit that includes a buffer status report indicator, the transmitting including transmitting the protocol data unit that includes the buffer status report indicator on a logical channel that meets a logical channel prioritization mapping restriction for at least one logical channel having data available according to the buffer status report indication; and
   responsive to an uplink grant from the network node, cause the transmission of the scheduling request to the network node without a cancellation of the scheduling request occurring due to the buffer status report indicator included in the protocol data unit of the terminal, the transmitting the scheduling request comprising configuring a logical channel not to cancel the protocol data unit before the scheduling request is triggered.

10. The terminal of claim 9, wherein the processor is further caused to:
    transmit to the network node at least one scheduling request triggered prior to the protocol data unit that includes the buffer status report indicator;
    and
    cancel the at least one scheduling request when the uplink grant can accommodate all pending data available for transmission.

11. The terminal of claim 9, wherein the triggered scheduling request comprises a scheduling request configuration subject to cancellation due to transmission of the buffer status report indicator on an existing physical uplink shared channel, wherein the scheduling request configuration is via radio resource control signaling.

12. The terminal of claim 11, wherein the transmitting comprises transmitting the scheduling request when the scheduling request configuration is mapped to an existing physical uplink control channel configuration having a short period.

13. The terminal of claim 12, further comprising:
    cancelling the scheduling request when the scheduling request configuration is mapped to an existing physical uplink control channel configuration having a long period.

14. The terminal of claim 9, wherein the logical channel is associated with a critical service.

15. The terminal of claim 14, wherein the logical channel is associated with a non-critical service, and the processor is further caused to:
    cancel the scheduling request for a logical channel associated with the non-critical service.

16. The terminal of claim 9, wherein the wireless network is an internet of things network.

17. A non-transitory computer storage medium storing a computer program that when executed causes a terminal in a wireless network to:

determine that a scheduling request is triggered for requesting an uplink resource for transmission of data to a network node;

transmit to the network node a protocol data unit that includes a buffer status report indicator, the transmitting including transmitting the protocol data unit that includes the buffer status report indicator on a logical channel that meets a logical channel prioritization mapping restriction for at least one logical channel having data available according to the buffer status report indication; and     responsive to an uplink grant from the network node, cause the transmission of the scheduling request to the network node without a cancellation of the scheduling request occurring due to a buffer status report indicator included in a protocol data unit of the terminal, the transmitting the scheduling request comprising configuring a logical channel not to cancel the protocol data unit before the scheduling request is triggered.

\* \* \* \* \*